R. SCHELIGA.
CUSHION TIRE.
APPLICATION FILED OCT. 10, 1914.
1,148,993.
Patented Aug. 3, 1915.
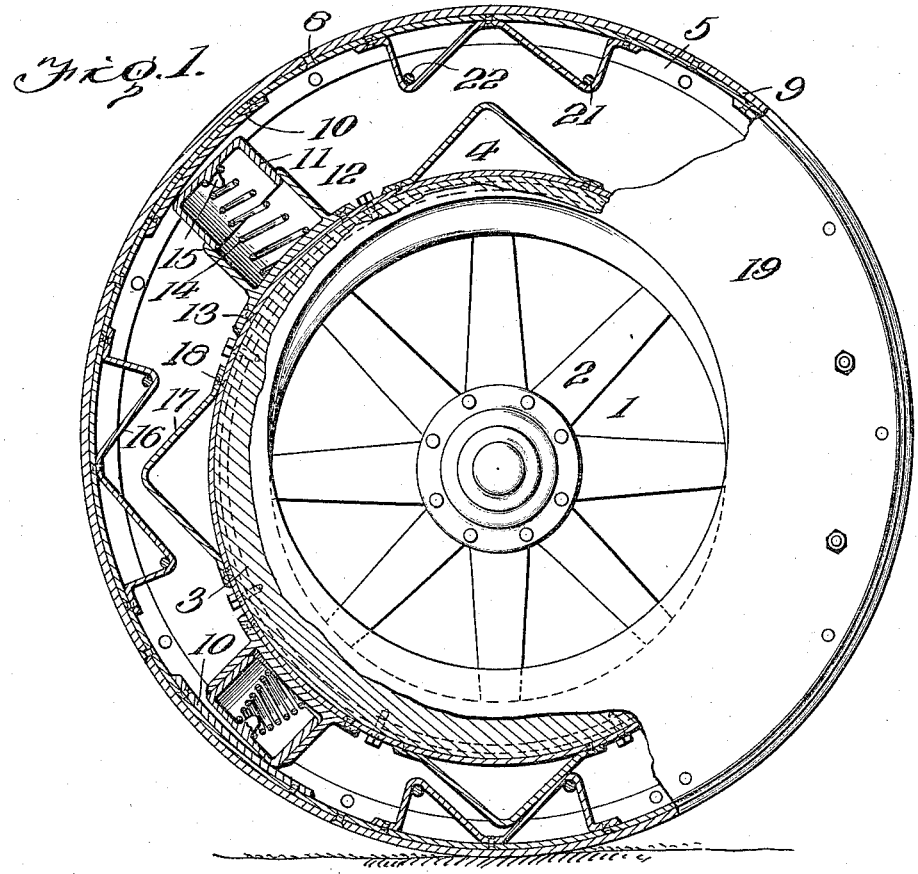
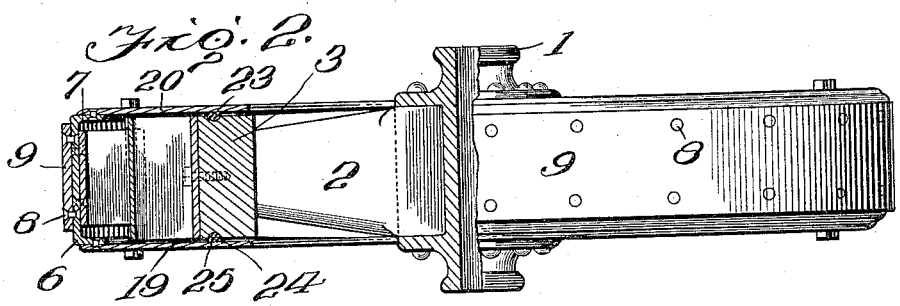
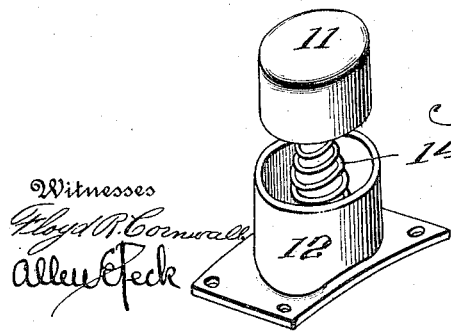
Witnesses
Inventor
R. Scheliga.
By
Attorney

UNITED STATES PATENT OFFICE.

RAYMOND SCHELIGA, OF HAWTHORNE, CALIFORNIA.

CUSHION-TIRE.

1,148,993.  Specification of Letters Patent.  Patented Aug. 3, 1915.

Application filed October 10, 1914. Serial No. 866,151.

*To all whom it may concern:*

Be it known that I, RAYMOND SCHELIGA, a citizen of the United States, residing at Hawthorne, in the county of Alameda and State of California, have invented certain new and useful Improvements in Cushion-Tires, of which the following is a specification.

My invention relates to improvements in cushion tires.

The object of my invention is to provide a cushion tire adapted to be applied to the ordinary wheel having a metal tire and which has all of the requirements necessary for a wheel of this character.

Another object of my invention is to provide a tire having the necessary resiliency without the use of a pneumatic tube thus doing away with any liability of punctures, which provides a cheaper and more effective tire.

A further object of my invention is to provide a tire of this character which is simple in construction and having certain details of structure hereinafter more fully set forth.

In the accompanying drawings: Figure 1 is a side elevation partly in section of my improved tire applied to the ordinary wheel. Fig. 2 is an edge view of the wheel partly in section. Fig. 3 is a top plan view of the telescoping cylinder separated.

Referring now to the drawings, 1 represents the hub of the ordinary wheel having the usual spokes 2, felly 3, and the metal tire 4. Surrounding the metal tire 4 and spaced a considerable distance therefrom is a second outside tire 5 having downwardly turned edges 6 and 7, the outer faces of which are in a vertical alinement with the outer edges of the tire 4. This outer tire 5 has riveted or bolted thereto by means of bolts 8 a covering of leather or other composition 9 which gives to the vehicle more resiliency and at the same time prevents the usual grinding of the metal tire.

Secured to the inner face of the outer tire 5 at equidistances apart are plates 10. Resting loosely against the inner faces of these plates are male cylinders 11 which telescope in the female cylinders 12. These female cylinders 12 are secured to the inner metal tire 4 by means of screws or bolts 13. Within the female cylinders 12 are coil springs 14 which have their lower ends bearing against the solid bottom of the cylinder and the upper end bearing against the upper end of the male cylinders 11. In order to prevent the coil spring 14 from getting out of place within the cylinder, I provide the male cylinder 11 with the downwardly extending projection 15 which enters the coils of the spring as fully shown in Fig. 1 of the drawings. As heretofore stated, these cylinders are arranged at proper distances apart and while as arranged there would be but four of these cylinders arranged around the periphery of the tire 5, it will be understood that any desired number may be used.

Secured to the inner face of the outer tire 5 is an arch-shaped plate 16 which coöperates with the arch-shaped plate 17 secured to the outer face of the inner tire 4 by means of bolts or rivets 18. These arch-shaped plates, as shown, are arranged between each pair of cylinders and serve as supports intermediate the same, and owing to the arch shape thereof, a certain amount of resiliency is obtained.

Riveted to the downwardly turned portions 6 and 7 of the outer tire 5, are the cover plates 19 and 20 which are of a width to extend inwardly and cover a small portion of the felly 3 of the wheel. These plates are further secured to the outer tire and held in a proper spaced relation by means of the transverse bolts 21 and 22 which extend through the arch plate 16 carried by the outer tire 5. These plates 19 while I have shown them made of a single piece of metal, it will be understood that they could be made in sections without departing from my invention.

The outer faces of the felly 3 are provided with semi-circular grooves 23 and 24 in which is placed a packing 25 adapted to bear against the inner faces of the plates 19 whereby a tight joint is formed to prevent any dirt from working in between the felly and the plates and entering the space between the outer and inner tires. This packing is adapted to receive a lubricant whereby the movement of the plates on the sides of the felly and the edge of the inner tire 5 is lubricated which allows of a freer movement of the outer tire and at the same time prevents any noise.

In operation it will be understood that the male cylinders 11 work freely within the female cylinders 12 and the springs 14 normally hold the cylinders in their extended position. As the wheel passes over the ground, that portion engaging the ground is compressed which causes the male cylinder to move inwardly within the female cylinder and compress the springs 14. The plates 19 slide inwardly over the sides of the felly and are again forced outwardly after that portion of the tire has been relieved of the weight of the vehicle.

Having thus fully described my invention what I claim and desire to secure by Letters Patent is:

1. A cushion wheel comprising concentric tires, single arched resilient plates carried by the outer surface of the inner tire and double arched resilient plates carried by the inner surface of the outer tire, said single arched plates projecting between the two arches of the double arched plates as a limit to circumferential movement of the outer tire, and spring actuated cushioning means carried by said inner tire.

2. A cushion wheel comprising concentric tires, single resilient arched members coöperating with double resilient arched members interposed between said tires and limiting the circumferential movement of the outer tire, and cushioning means carried by said inner tire.

3. A cushion wheel comprising concentric tires, single arched resilient plates coöperating with doubled arched resilient plates interposed between said tires and limiting the circumferential movement of the outer tire, said single arched plates projecting between said double arched plates and acting as a means for transmitting power from the inner tire to the outer tire, and cushioning means carried by the inner tire.

4. A cushion wheel comprising concentric tires, single arched resilient plates carried by the outer surface of the inner tire coöperating with double arched resilient plates carried by the inner surface of the outer tire, said coöperating resilient plates limiting the circumferential movement of the outer tire and acting as means for transmitting power from the inner tire to the outer tire.

In testimony whereof I affix my signature in presence of two witnesses.

RAYMOND SCHELIGA.

Witnesses:
 MILO DOTSON,
 GAYFORD RUTHERFORD.

Copies of this patent may be obtained for five cents each, by addressing the "Commissioner of Patents, Washington, D. C."